Dec. 1, 1959 J. C. VAN RIJN 2,915,657
DYNAMO ELECTRIC MACHINE STRUCTURE INCLUDING BEARING
Filed Sept. 10, 1958 2 Sheets-Sheet 1

INVENTOR
JACOBUS C. VAN RIJN

BY *Andrus and Smith*

ATTORNEYS

Dec. 1, 1959    J. C. VAN RIJN    2,915,657
DYNAMO ELECTRIC MACHINE STRUCTURE INCLUDING BEARING
Filed Sept. 10, 1958    2 Sheets-Sheet 2

INVENTOR
JACOBUS C. VAN RIJN

BY *Andros and Smith*

ATTORNEYS

United States Patent Office 2,915,657
Patented Dec. 1, 1959

2,915,657

DYNAMO ELECTRIC MACHINE STRUCTURE INCLUDING BEARING

Jacobus C. Van Rijn, Woodstock, N.Y.

Application September 10, 1958, Serial No. 760,121

10 Claims. (Cl. 310—66)

This invention relates to bearing lubrication for electric motors, especially for small motors.

In the design of small electric motors it is generally found that the customary casing around the motor and the associated bearing holders become relatively large and thereby negate much of what was accomplished in the way of reducing the size of the essential electric and magnetic motor structure. When the motor is required to operate over long periods of time without re-greasing or re-oiling, it is furthermore customary to provide large grease or oil holding reservoirs adjacent to each of the two bearings, which further detracts from the objective of obtaining a compact design.

One approach to the reduction of size of small motors, particularly as associated with small air-moving fans or blowers, is disclosed in my co-pending application, Serial No. 549,104, "Two-Piece Cantilever Fan and Motor," now Patent No. 2,855,141. This invention uses an inside-out type of electric motor and a cantilever type bearing holding arbor.

A type of motor is known in which porous bearings are mounted in the ends of a bore through a cylindrical core of soft iron and grease is packed in the bore between the two bearings. The resulting small space allowed for location of the bearings of such earlier design, however, allows for only a limited reservoir capacity for oil or grease.

My present invention overcomes this drawback by providing one or more oil or grease reservoirs located inside the motor lamination. The lubricant reservoirs are cut out of the stator laminations at points where the magnetic properties of the stator lamination iron is not required since the spaces consequently are useless so far as electric motor operation is concerned.

An object of my invention is to provide an adequate supply of lubricant without bulking up the motor in order to be able to make such a motor as small as possible, but with the largest possible reservoir so that frequent replenishing of the lubricant is not required.

A further object of the invention is the provision of a plurality of lubricant reservoirs within the motor laminations, not only to increase the lubricant capacity, but also to reduce the weight of the motor.

Other and further objects and advantages will become apparent from the following specification, when read in connection with the accompanying drawings, in which like reference characters refer to like parts in the several views, and in which.

Figure 1:
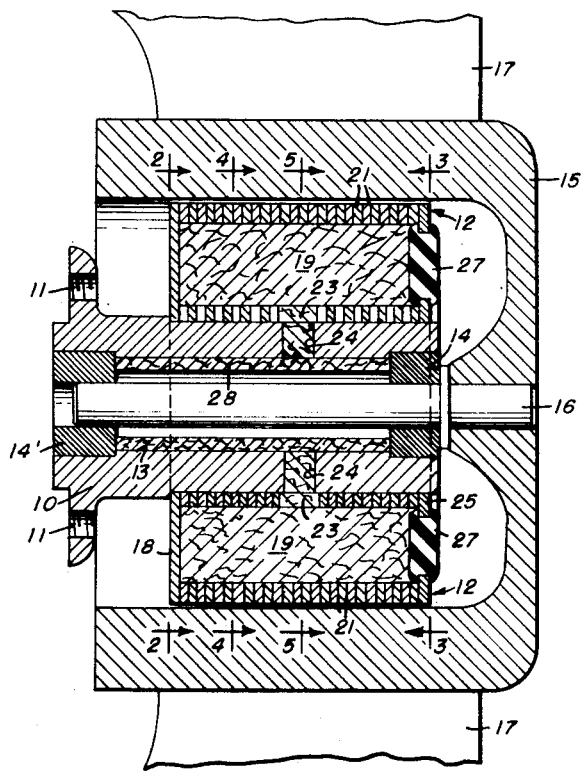
Fig. 1 is a longitudinal cross section of a motor incorporating the invention showing one form of supporting structure.

As seen in Fig. 1, the motor includes an arbor 10 which may be secured to any suitable stationary support (not shown) by bolts engaged in bolt holes 11. Motor laminations assembly 12, made up of a plurality of flat laminations, to be more specifically described below, are mounted on the outside of the arbor 10. A central bore 13 through the arbor is provided at each end with a porous bearing 14 and 14' made of any known porous bearing material such as porous bronze. Ball or needle bearings could also be used.

A rotor 15 of cup shape surrounds the arbor and its lamination assembly 12, which assembly carries appropriate windings which are not shown. The cup-shaped rotor 15 carries a central shaft 16 that extends through both bearings 14, 14'. As presently used the rotor 15 is provided with fan blades 17 extending radially therefrom but the invention is not limited to use in a fan motor.

The several laminations forming the lamination assembly 12, shown in Fig. 1, are illustrated in Figs. 2, 3, 4 and 5 on a smaller scale. These laminations are for a two-pole, shaded-pole, type of motor. For other than two-pole motors the usefully available spaces will be at different locations than in the illustrated motor and the invention contemplates the idea of using any such available and non-used lamination spaces.

In Figs. 2, 3, 4 and 5 there are seen, at each side of the particular laminum shown, the notches in which the windings of the motor are placed.

Figure 2:
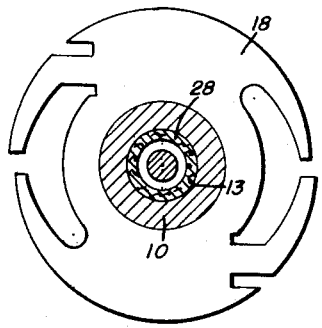
Fig. 2 is a section of the stationary part of the motor taken on the line 2—2 of Fig. 1.

The laminum 18 shown in Fig. 2 is imperforate. As seen in Fig. 1 this laminum 18 forms the closed ends of spaces 19 which are the lubricant reservoirs. The reservoirs 19 are generally cylindrical, although a different shape may be used if desired, formed by apertures 20 as seen in the laminum 21 in Fig. 4 and apertures 20' in laminum 22 in Fig. 5.

Figure 5:
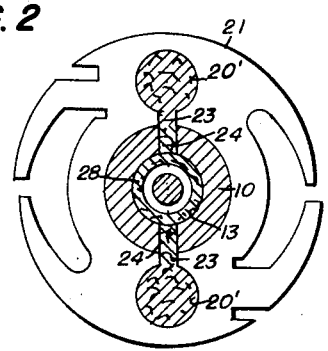
Fig. 5 is a similar section of the motor taken on line 5—5 of Fig. 1.

From Fig. 1 it will be seen that a plurality of identical laminae 21 are assembled on each side of the center part of the lamination assembly. At the center portion of the lamination assembly, laminae 22, as seen in Fig. 5, are provided with apertures 20' that are connected by a slot 23 to an aperture 24 that extends to bore 13 in arbor 10.

Figure 3:
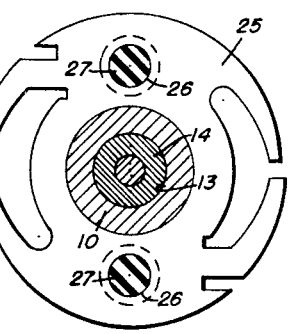
Fig. 3 is a section of the stationary part of the motor taken on the line 3—3 of Fig. 1.
Figure 4:
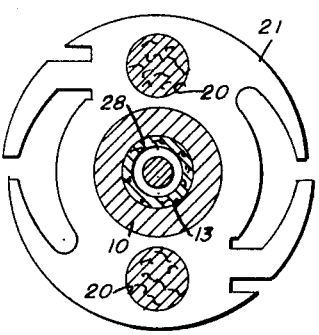
Fig. 4 is a section of the motor, similar to Figs. 2 and 3, taken on line 4—4 of Fig. 1.

The end of the reservoir 19 is closed by laminum 25 seen in Fig. 3. Laminum 25 is provided with apertures 26 that align with the reservoirs 19. These apertures 26 are closed by plugs 27 of puncturable resilient material, such as synthetic rubber, or other plastic, that is inert to lubricant.

The reservoirs 19 and passages 24 are filled with felt wicking and a cylinder of wicking 28 is placed in bore 13 and is in close contact with the wicking in apertures 24. It will be noted that wicking 28 has an interior diameter greater than shaft 16 so it will not rub against the shaft. Wicking 28 is in tight contact with porous bearings 14 and 14' to complete the path of flow of lubricant from reservoirs 19 through passages 24 and via wicking 28 to the porous bearings 14 and 14'.

The lubricant is replenished, or furnished in the first instance, by piercing the plugs 27 with a hypodermic needle, or syringe and operating the syringe. The resilient material of plugs or grommets 27 will close the holes made by the syringe.

Figure 6:
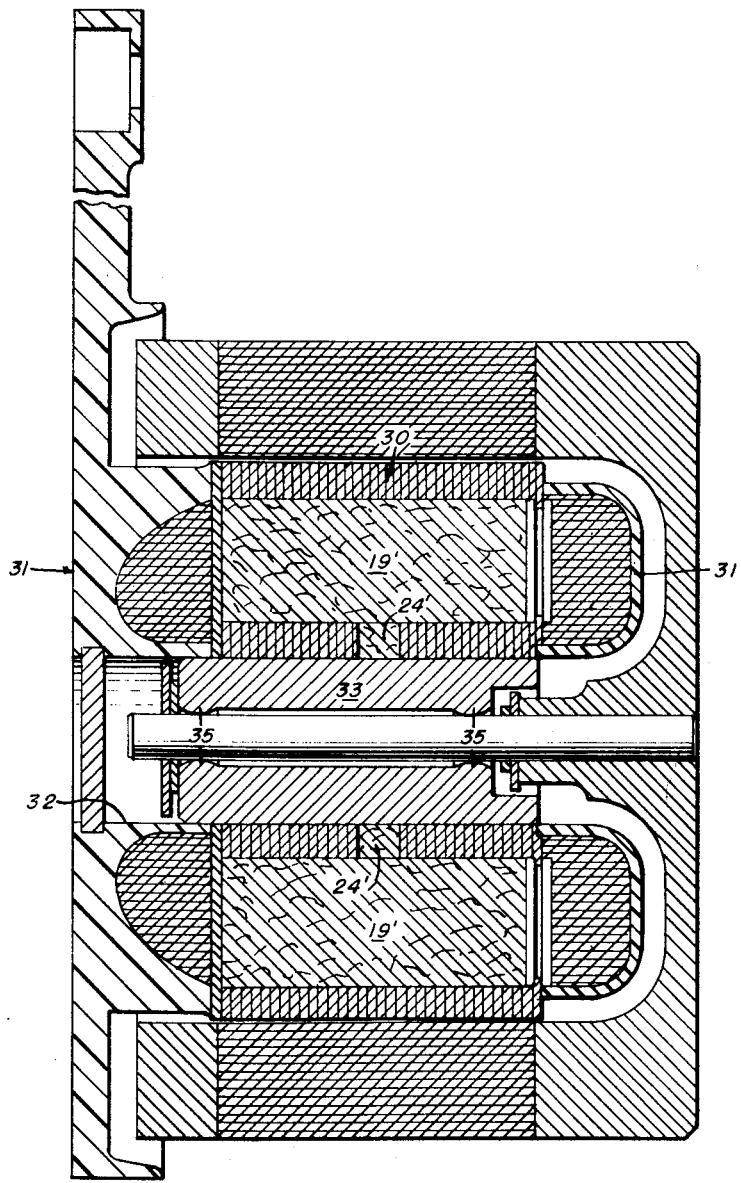
Fig. 6 is a view similar to Fig. 1 showing another form of supporting structure.

Referring now to Fig. 6, it will be seen that there is no arbor such as that shown in Figs. 1–5; nor is there any felt wicking. However, the same type of stator assembly comprising a plurality of radially extending laminae of magnetic material is employed as indicated generally at 30. The supporting means, indicated at 31, comprises an insulating and structural winding encapsulating material (preferably epoxy resin) connecting the assembly together.

A central shaft receiving opening 32 is provided in the supporting and connecting means for the stator laminae assembly, and at least one shaft receiving bearing 33 is present in the opening 32.

The same inventive improvement as shown in Figs. 1–5 is present comprising a cavity or lubricant reservoir 19', that is connected by a passage 24' to the opening 32.

The bearing 33 has two bearing surfaces 35 and is lubricated from the cavity or lubricating reservoir 19'. The bearing 33 is of porous bearing material that preferably includes the bearing surfaces 35 to which lubricant constantly will be supplied from the cavity 19'.

The invention may be carried out in other ways than those set forth above without departing from the spirit and essential characteristics of the invention. The described embodiments are to be considered, therefore, to be the way of example and not as restrictive. All structures coming within the meaning and range of equivalents of the following claims are intended to be embraced therein.

Having described my invention what I claim as new and desire to secure by Letters Patent is:

1. In an electric motor of the type described having a stator comprising a core of magnetic material, supporting means therefor, a central shaft receiving opening in said means, at least one shaft receiving bearing in said opening, the improvement comprising a cavity in said core adapted to receive lubricant for said bearing, and a passage from said cavity to said opening whereby lubricant constantly will be supplied from said cavity to said bearing.

2. In an electric motor of the type described having a stator comprising a core of magnetic material, supporting means therefore, a central shaft receiving opening in said means, at least one shaft receiving bearing in said opening, the improvement comprising a cavity in said core adapted to receive lubricant for said bearing, a radial passage from said cavity to said opening, and means in said opening cooperatively associating said passage with said bearing whereby lubricant constantly will be supplied from said cavity to said bearing.

3. In an electric motor of the type described having a stator assembly comprising a plurality of radially extending laminae of magnetic material mounted on an arbor, a central shaft receiving bore in said arbor, at least one shaft receiving bearing fixed in said bore, the improvement comprising a cavity in said assembly adapted to receive lubricant for said bearing, a radial passage from said cavity to said bore, wicking in said passage and in said bore, the wicking in said bore contacting said bearing whereby lubricant will be constantly supplied from said cavity to said bearing.

4. The structure of claim 3 in which the wicking in said bore is in the form of a hollow cylinder lying closely against the wall of the bore and having an interior diameter greater than the interior diameter of said bearing.

5. The device of claim 3 in which said cavity is filled with wicking.

6. The device of claim 3 in which one end laminum of said assembly forms a closed end of said cavity and the other end laminum of said assembly is provided with an aperture in alignment with said cavity, said aperture being closed with a material such that it may be perforated by a sharp instrument and will re-seal upon withdrawal of said instrument.

7. The device of claim 3 in which said cavity is located at a point where the magnetic properties of said stator laminations are not required insofar as electric motor operation is concerned.

8. In an electric motor of the type described having a stator assembly comprising a plurality of radially extending laminae of magnetic material, means cooperatively supporting and connecting said laminae together, a central shaft receiving opening in said means, at least one shaft receiving bearing in said opening, the improvement comprising a cavity in said assembly adapted to receive lubricant for said bearing, a radial passage from said cavity to said opening, and wicking means in said opening bringing said bearing and passage into communication whereby lubricant constantly will be supplied from said cavity to said bearing.

9. The structure of claim 8 in which said wicking means comprises a sleeve of porous material.

10. The structure of claim 8 in which said wicking means comprises a sleeve of porous bearing material including said shaft receiving bearing.

No references cited.